United States Patent

Mozdzanowski

[11] Patent Number: 5,273,062
[45] Date of Patent: Dec. 28, 1993

[54] UMBRELLA

[76] Inventor: Peter Mozdzanowski, 22 Mulberry St., Agawam, Mass. 01001

[21] Appl. No.: 993,839

[22] Filed: Dec. 21, 1992

[51] Int. Cl.⁵ .............................................. A45B 3/00
[52] U.S. Cl. ........................................ 135/16; 135/28; 135/33.2; 248/530
[58] Field of Search .................. 135/16, 20.3, 33.2, 135/28, 33.7; 248/530, 532, 533, 545, 156

[56] References Cited

U.S. PATENT DOCUMENTS

| | | | |
|---|---|---|---|
| 1,148,332 | 7/1915 | Onyskow | 135/16 |
| 1,173,665 | 2/1916 | Jakab | 135/16 X |
| 1,555,579 | 9/1925 | Howell | 135/16 |
| 1,683,270 | 9/1928 | Taylor et al. | |
| 2,627,217 | 2/1953 | Hainke et al. | 135/16 X |
| 2,729,220 | 1/1956 | Smyrnow | 135/16 |
| 2,817,281 | 12/1957 | Schwan et al. | 135/16 |
| 3,102,547 | 9/1963 | Domina | 135/16 |
| 3,177,881 | 4/1965 | Covington | 135/16 |
| 3,318,560 | 5/1967 | Garrette, Jr. et al. | 248/532 X |
| 3,444,799 | 5/1969 | Covington | 135/16 X |
| 4,154,255 | 5/1979 | Weaver | 135/16 |
| 4,628,791 | 12/1986 | Phipps | 84/94 C |
| 4,753,411 | 6/1988 | Lechner et al. | 248/533 |
| 4,850,564 | 7/1989 | Padin | 248/533 |
| 4,867,187 | 9/1989 | Divine | 135/16 |
| 4,915,670 | 4/1990 | Nesbit | 455/344 |
| 5,007,811 | 4/1991 | Hopkins | 135/16 |
| 5,161,561 | 11/1992 | Jamieson | 135/16 |
| 5,172,711 | 12/1992 | Mueller et al. | 135/16 |

FOREIGN PATENT DOCUMENTS 2617689  1/1989  France ........................... 135/16

Primary Examiner—David A. Scherbel
Assistant Examiner—Lan M. Mai
Attorney, Agent, or Firm—Timmons & Kelly

[57] ABSTRACT

A beach umbrella has a shaft, ribs, gores, stretchers, and a runner to open and close the umbrella. A container is attached to the runner, container a radio and a locked storage compartment. A fan assembly is also attached to the runner to force air downward onto a person under the umbrella. The umbrella also has a base with threads on the lower end of the base, so the umbrella can be threaded into the ground. A platform on the base provides a stable foundation, and handles on the platform facilitate the threading of the umbrella into the ground.

11 Claims, 2 Drawing Sheets

UMBRELLA

BACKGROUND OF THE INVENTION

1. Field of the Invention

This invention relates in general to umbrellas. In particular, the invention relates to umbrellas having radios.

2. Description of the Prior Art

Beach umbrellas are often used to provide an area of shade on a sunny beach. People on a beach often like to listen to music on a radio while they rest under the umbrella. Some umbrellas have a radio attached to the handle of the umbrellas, so that people do not have to carry both an umbrella and a radio to the beach. Such radios have in the past been battery operated, so access to an electrical outlet is unnecessary.

Beach umbrellas usually have a long straight shaft, which can be stuck in the ground to support the umbrella. Inserting the shaft into the sand can be difficult at times, and amount of support that is provided is dependent on the stability of the ground.

SUMMARY OF THE INVENTION

The general object of the invention is to provide a radio equipped beach umbrella, having a fan for moving air beneath the umbrella. Another object of the invention is to provide an umbrella that can be threaded into the ground and has a platform to provide a stable base for the umbrella.

These objects are met by an umbrella having a container connected to the runner for movement along the shaft of the umbrella. The container houses a radio, and a fan assembly is connected to the container. The container also houses a storage compartment for small items, such as car keys and change.

The above, as well as additional objects, features, and advantages of the invention will become apparent in the following detailed description.

DESCRIPTION OF THE PREFERRED EMBODIMENT

Figure 1:
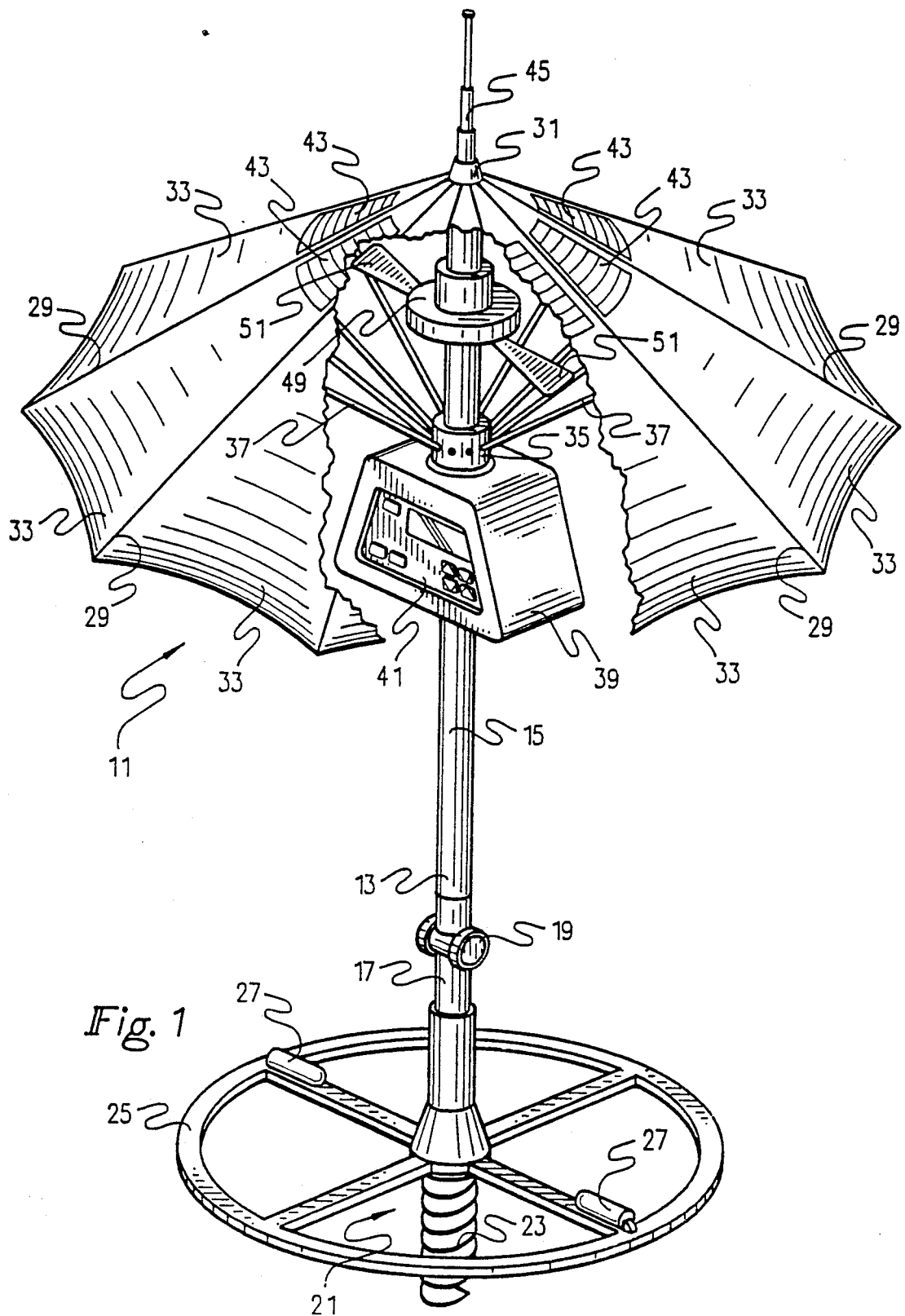
FIG. 1 is a front perspective view of an umbrella incorporation the invention, partially broken away.
Figure 2:
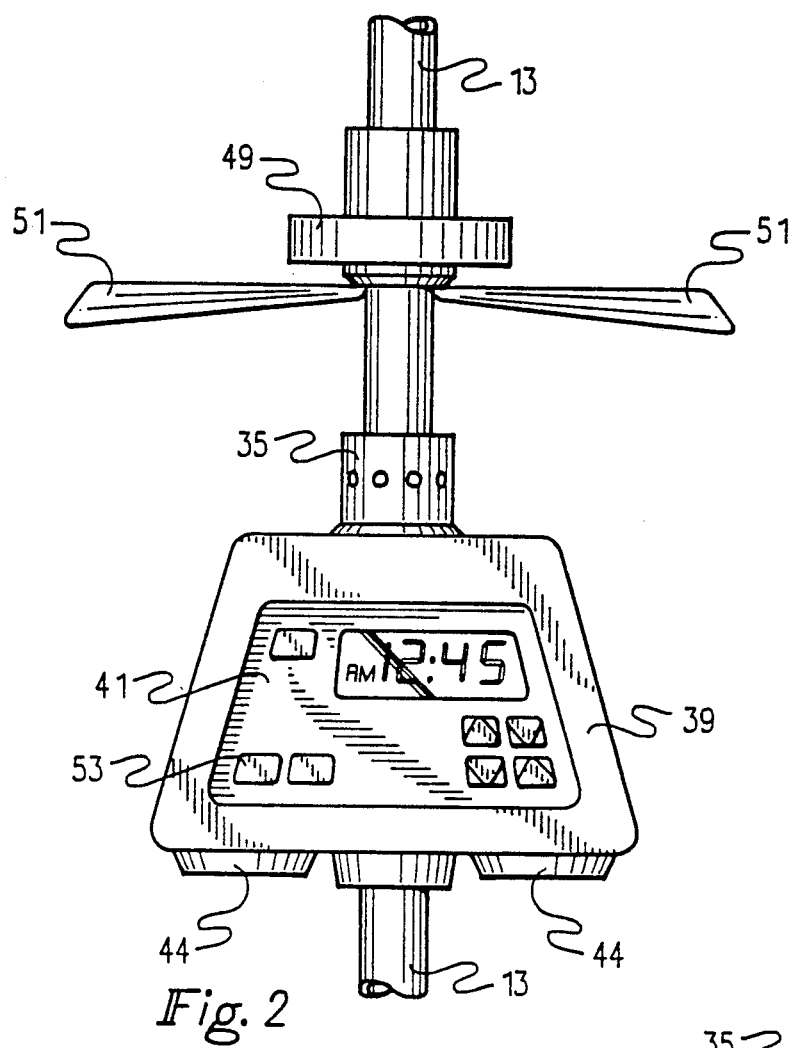
FIG. 2 is a front elevation of a front elevation of a portion of the umbrella of the invention.
Figure 3:
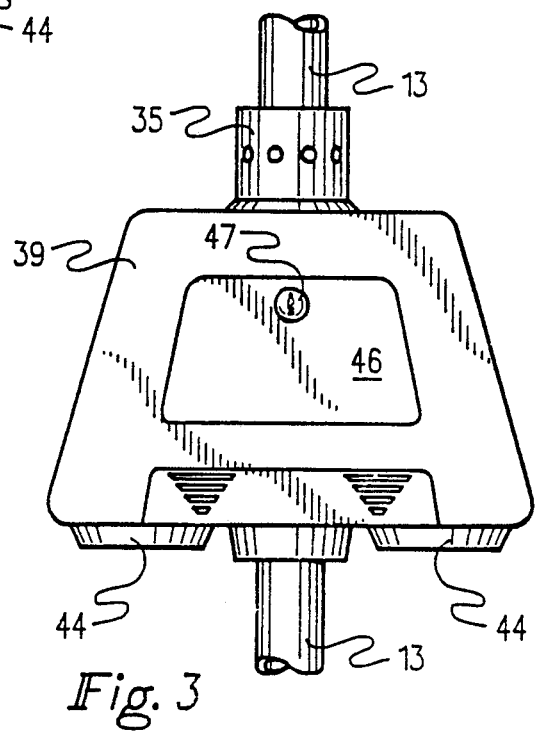
FIG. 3 is a rear elevation of the container of the invention.

The umbrella 11 of the invention has a shaft 13, as shown in FIG. 1. In the preferred embodiment, the shaft 13 has an upper shaft 15 and a lower shaft 17, connected by a connector 19 that allows the upper shaft 15 to be moved to a selected angle relative to the lower shaft 17.

The lower shaft 17 is inserted into a base 21. The base 21 has external threads 23, so that the base 21 can be threaded into the ground. A circular platform 25 on the base 21 supports the umbrella 11 when the threads 23 are threaded into the ground.

A pair of handles 27 on the platform 25 facilitate the threading of the base 21 into the ground. The handles 27 are spring-loaded to lie flat on the platform 25 until needed. The handles 27 can then be raised to an upright position.

As in most umbrellas, a plurality of ribs 29 are connected to the upper end 31 of the shaft 13. A plurality of gores 33 extend between the ribs 29. A runner 35 moves up and down along the shaft 13, and a plurality of stretchers 37 extend between the runner 35 and the ribs 29. Thus, as the runner 35 is moved upward along the shaft 13, the umbrella 11 is opened, and as the runner 35 is moved downward along the shaft 13, the umbrella 11 is closed.

A container 39 is connected to the runner 35, and moves with the runner 35 along the shaft 13. The container 39 houses a radio 41 that may be battery operated. As an alternative, there may be solar panels 43 in the gores 33, for converting solar power into electrical power to operate the radio 41. The speakers 44 for the radio 41 may be located on the bottom of the container 39. The umbrella 11 may also have a radio antenna 45 extending upward from the upper end 31 of the shaft 13.

The container 39 also has a storage compartment for securing valuables, such as car keys and change. Access to the storage compartment is through a door 46 secured by a lock 47.

A fan assembly 49, having a pair of blades 51, is also connected to the runner 35, and moves with the runner 35 and the container 39 along the shaft 13. When the fan 49 is turned on, the blades 51 will force air downward toward a person sitting under the umbrella 11. The switch 53 for the fan 49 may be located on the container 39. The fan blades 51 may be removed or folded when the umbrella 11 is closed.

The umbrella 11 of the invention has several advantages over the prior art. The umbrella 11 can be easily screwed into the ground to provide a stable base for the umbrella 11. Also, the umbrella 11 has an integral radio 41 and a fan 49 for convenience. The base 21 can be used with other types of umbrellas, by inserting the umbrella shaft into the base 21.

The invention has been shown in only one embodiment. It should be apparent to those skilled in the art that the invention is not so limited, but is susceptible to various changes and modifications without departing from the spirit of the invention.

I claim:

1. An umbrella, comprising:
   a shaft having an upper end;
   a runner for movement along the shaft;
   a plurality of ribs attached to the upper end of the shaft;
   a plurality of gores extending between the ribs;
   a plurality of stretchers, extending between the runner and the ribs for opening and closing the gores as the runner is moved along the shaft; and
   a container attached to the runner for movement along the shaft, and containing a radio.

2. An umbrella as recited in claim 1, further comprising radio speaker contained by the container and electronically attached to the radio.

3. An umbrella as recited in claim 2, further comprising a base, wherein the shaft can be inserted into the base, with external threads on the lower end of the base for threading the base into the ground.

4. An umbrella as recited in claim 3, further comprising a platform attached to the base at the top of the threaded section and extending away from the base to support the umbrella while threaded into the ground.

5. An umbrella as recited in claim 4, further comprising a handle on the base for facilitating the threading of the shaft into the ground.

6. An umbrella as recited in claim 5, further comprising a locked storage area in the container.

7. A umbrella as recited in claim 6, further comprising a fan attached to the runner for movement along the shaft.

8. An umbrella as recited in claim 7, wherein the fan is located directly above the container.

9. An umbrella as recited in claim 8, further comprising a radio antenna extending upward from the upper end of the shaft and electronically attached to the radio.

10. An umbrella as recited in claim 9, further comprising a solar panel on the upper side of one of the gore for providing electrical power to the radio.

11. An umbrella as recited in claim 10, further comprising a joint in the shaft for allowing the upper portion of the shaft to be moved to a position at an angle to the lower portion of the shaft.

* * * * *